Patented Apr. 7, 1925.

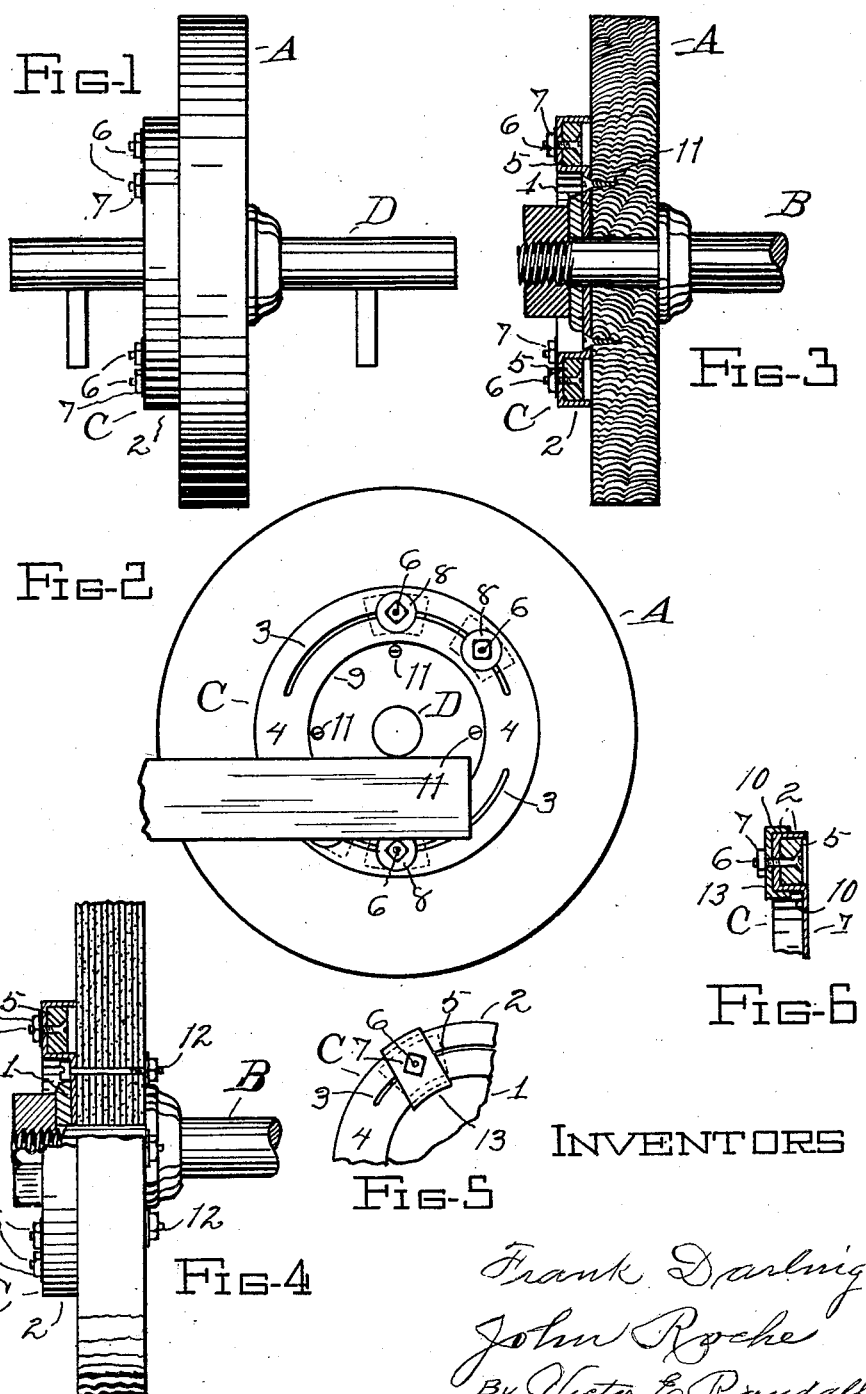

1,532,687

UNITED STATES PATENT OFFICE.

FRANK DARLING AND JOHN ROCHE, OF BATTLE CREEK, MICHIGAN.

BALANCING DEVICE FOR POLISHING WHEELS.

Application filed July 19, 1922. Serial No. 576,147.

*To all whom it may concern:*

Be it known that we, FRANK DARLING and JOHN ROCHE, citizens of the United States, residing at Battle Creek, in the county of Calhoun and State of Michigan, have invented certain new and useful Improvements in Balancing Devices for Polishing Wheels, of which the following description, with the appended claims, taken in connection with the accompanying drawings, forms a specification.

The present invention relates to balancing devices more particularly adapted for use in connection with polishing and buffing wheels for counteracting any unbalanced condition arising in its formation or brought about by wear.

A characteristic feature of the present invention lies in its direct attachment to the side of a wheel independent from any means for securing either the wheel or balancing mechanism to its shaft.

Polishing wheels, and buffing wheels more especially, are as generally practiced balanced by tacking or nailing small pieces of lead to their sides. This practice is inconvenient for many reasons that are obvious, chief among which is the uncertainty of selecting a balance of the proper weight, to say nothing of affixing the same to effect the desired result, and the spoiling of the side of the wheel by the driving of nails and the removal and replacement of both nails and lead pieces; also the danger of the balancing pieces becoming loose and injuring operators.

An important object of the present invention is to provide a mechanism of the character whereby the wheel and balancing mechanism may be removed from their shaft intact and placed on a balancing arbor and rebalanced without separation; whereby the counterbalancing of a wheel may be effected readily and without great inconvenience; whereby the mechanism may be easily assembled, economical to manufacture and thoroughly safe in operation. These and other objects and advantages will be readily apparent to those familiar with the art to which this invention appertains, and to others who recognize the law of equilibrium in rotating bodies.

In the drawings forming a part of this specification, Figure 1 is an edge view of a polishing wheel and balancing mechanism on an arbor resting on parallel bars, in the mode of adjusting said wheel.

Fig. 2 is a side view of Fig. 1.

Fig. 3 is a transverse vertical section of a polishing wheel and balancing mechanism mounted on an operating shaft.

Fig. 4 is a broken edge section of a buffing wheel and balancing mechanism mounted on an operating shaft.

Fig. 5 is a detail side view of the balancing housing and shows a modified form of a bolt-holding clip.

Fig. 6 is a broken edge view of the balancing housing and shows a modified form of a bolt-holding clip.

Like marks of reference refer to corresponding or equivalent parts in the different views, in which A represents a polishing wheel; B, the shaft upon which the wheel is journalled; and C, the balance mechanism housing.

The housing C is preferably formed of sheet metal stamped in requisite shape, round in form, and having a central opening through which a shaft B or balancing arbor D may be inserted.

The balancing case proper is an annular rectangular-shaped channel formed about a web center 1, through which the shaft B is operative, the channel portion preferably being of somewhat greater width than its height, and having the edge of its outer wall 2 coincident with the side of the center 1 and adapted to rest against the wheel to which the mechanism is to be attached. The casing by preference is formed with two arc-shaped slots 3 centrally disposed between its outer end and inner walls and separated at their ends by correspondingly-formed portions 4 of said housing. Within the housing a series of arcuate balancing weights 5 rectangular in cross section are placed. These weights are secured in the housing by means of bolts 6 passing from said weights through the slots 3 and locked by means of nuts 7 screw-threaded to the outer ends of said bolts, washers, 8, being placed between the nuts and the casing to more fully stabilize the asemblage of parts.

In Figs. 5 and 6, in lieu of the washers 8, binding plates 13 are used. These plates have arcuate concentrically-disposed flanges 10 which fit over the side walls of the housing, and the bolts 6 preferably have heads adapted to seat below the inner faces of the balancing weights within which they are placed, and so arranged that when the weights are in proper position a slight space will intervene between the side of the wheel and said weights.

At intervals through the web or flattened portion 1 of the balancing casing, screw or bolt holes are formed in close proximity to the inner wall 9 of said housing, and through these holes screws or bolts 11 and 12 as occasion may require, are used to secure the balancing mechanism to a wheel. If the wheel is of heavy fibrous material such as leather, for instance, screws, as 11, are used to attach the balancing mechanism to the wheel, and where a buffing wheel of cloth or similar material is used, small bolts, as 12, (see Fig. 4) pass from said mechanism through said wheel and are secured by means of nuts, in the customary manner for securing bolts, as shown.

Preferably two slots 3, as described, are used in a mechanism, as set forth. However, three slots may be used to good advantage. It is advantageous to place at least two counterbalancing weights with bolt attachments in a slot, especially where two slots are used, as by this means the weights may be moved along in their housing to effect a counterbalancing of the wheel with a minimum of both time and labor.

A mechanism as disclosed is economical in many ways. It saves time in effecting the balancing of a wheel, and being made primarily of stampings it is comparatively cheap to produce owing to its mode of manufacture.

The drawings show, and we have described, a preferred embodiment of our counterbalancing mechanism. However, it would be obvious to those skilled in mechanics that various changes in minor details could be resorted to for effecting a like operation of the device, and we reserve the privilege to design and carry into practice any reasonable modification of the invention disclosed.

Having, therefore, described our invention, what we claim as new and desire to secure by Letters Patent, is:—

A balancing device having in combination a disc-shaped body with a peripheral rectangular groove opening on one side, said groove having centrally-disposed arcuate slots formed through its bottom, arcuate weights carried in said groove, bolts passing through said slots and engaging said weights, binding plates passing over said bolts and nuts run onto said bolts over said plates whereby said weights may be adjustably secured within the groove of said disc, substantially as described.

FRANK DARLING.
JOHN ROCHE.

Witnesses:
  F. H. WINGATE,
  H. H. BALDORFF.